United States Patent [19]

Russo

[11] 3,975,317
[45] Aug. 17, 1976

[54] METHOD OF PREPARING NON-FRIABLE RIGID POLYURETHANE FOAM

[75] Inventor: Robert V. Russo, Brooklyn, N.Y.

[73] Assignee: M & T Chemicals Inc., Greenwich, Conn.

[22] Filed: Jan. 30, 1975

[21] Appl. No.: 545,728

[52] U.S. Cl. .................. 260/2.5 AC; 260/75 NC; 260/77.5 AC
[51] Int. Cl.² ............... C08G 18/14; C08G 18/24; C08G 18/18
[58] Field of Search ............ 260/2.5 AB, 2.5 AC, 260/75 NB, 75 NC, 77.5 AB, 77.5 AC

[56] References Cited
UNITED STATES PATENTS

| | | | |
|---|---|---|---|
| 3,582,501 | 6/1971 | Hostettler et al. | 260/2.5 AB |
| 3,726,855 | 4/1973 | Lapkin | 260/209 R |
| 3,732,176 | 5/1973 | Hostettler et al. | 260/2.5 AB |
| 3,808,162 | 4/1974 | Allen et al. | 260/77.5 AB |

Primary Examiner—H.S. Cockerman
Attorney, Agent, or Firm—Robert P. Auber; Kenneth G. Wheeless; Robert Spector

[57] ABSTRACT

The friability of rigid polyurethane foams prepared using a chlorine- or bromine-containing polyol is significantly reduced or eliminated by the use of a dimethyltin-S,S'-bis(alkylmercaptocarboxylate) as the polymerization catalyst.

7 Claims, No Drawings

METHOD OF PREPARING NON-FRIABLE RIGID POLYURETHANE FOAM

BACKGROUND

This invention relates to the preparation of rigid cellular polyurethanes. This invention relates particularly to a method for reducing the friability of cellular polyurethanes derived from certain halogen-containing polyols.

Flame retardant, rigid polyurethane foams can be obtained by reacting a chlorine- or bromine-containing polyol with a polyfunctional isocyanate. Methods for preparing many types of halogen-containing polyols are known in the art. Adducts of 4,4,4-trichloro-1,2-epoxybutane with polyhydric alcohols, particularly carbohydrate-based materials have been recognized as particularly effective precursors for flame retardant rigid polyurethane foams. A method for preparing this latter class of halogenated polyols is described in U.S. Pat. No. 3,726,855, the disclosure of which is hereby incorporated by reference. When many of the aforementioned types of halogen-containing polyols are reacted with a polyfunctional isocyanate in the presence of conventional polymerization or gel catalysts, which include tertiary amines and compounds of divalent or tetravalent tin, such as stannous octoate and dibutyltin dilaurate, the resultant foams are often so friable that they cannot be handled without breaking or, in extreme instances, crumbling to a fine powder. The excellent flame retardancy exhibited by these foams is more than offset by this shortcoming and has delayed their acceptance in applications such as construction, which has a great need for these types of foams as insulating materials.

It is therefore an objective of this invention to increase the structural strength of rigid polyurethane foams derived from halogenated polyols. Surprisingly it has now been found that this objective is realized if the polymerization catalyst used to prepare the foam is a mixture of a dimethyltin-S,S'-bis(alkylmercaptocarboxylate) and a tertiary amine.

SUMMARY OF THE INVENTION

This invention provides a method for preparing flame retardant rigid cellular polyurethanes that exhibit reduced friability by reacting 1. 100 parts by weight of a polyol containing between 25 and 50% by weight of chlorine or bromine and at least 4 hydroxyl radicals, wherein the hydroxyl number of said polyol is between 175 and 800,
2. a polyfunctional isocyanate exhibiting a functionality of between 2.2 and 2.7, wherein the total number of equivalents of isocyanate radicals is between 0.95 and 1.2 times the total number of hydroxyl radicals in said polyol, the reaction being conducted in the presence of between 20 and 40 parts of a foaming agent selected from the group consisting of halogenated aliphatic hydrocarbons exhibiting a boiling point of between −30° and 80°C., between 0.05 and 0.5 part of a polymerization catalyst of the formula $(CH_3)_2Sn(SR^1COOR^2)_2$ wherein $R^1$ is an alkylene radical containing between 1 and 12 carbon atoms and $R^2$ is selected for the group consisting of alkyl radicals containing between 1 and 20 carbon atoms, cycloalkyl, aryl, alkaryl and aralkyl radicals, between 0.2 and 1.5 parts of a tertiary amine cocatalyst and between 0.5 and 3 parts of a silicone oil surfactant.

DETAILED DESCRIPTION OF THE INVENTION

A. The Polyol

Any available chlorine- or bromine-containing polyol having at least four hydroxyl groups and a hydroxyl number of between 175 and 800, preferably between about 250 and about 600 can be employed to prepare flame retardant urethane foams. To obtain a useful degree of flame retardancy the polyol should contain between 25 and 50%, preferably between 40 and 50%, by weight of chlorine or bromine. Polyols employed in the production of rigid polyurethanes are conventionally prepared by reacting one or more olefin oxides, such as ethylene, propylene or 1,2-butylene oxide, with a saccharide or suitable derivative thereof containing four or more hydroxyl groups. Sucrose, dextrose, and α-methyl glucoside are examples of suitable saccharides. The aforementioned saccharide derivatives include reaction products of the saccharides with either water or a polyhydric alcohol. Suitable polyhydric alcohols include glycerol, ethylene glycol, propylene glycol, pentaerythritol and sorbitol. Preferably one mole of polyhydric alcohol is reacted with each mole of saccharide. A method for preparing the saccharide derivative is described in the aforementioned U.S. Pat. No. 3,726,855. The reaction product may subsequently be oxyalkylated using an olefin oxide prior to being reacted with the halogen-containing olefin oxide.

To prepare a flame retardant polyurethane foam, a portion or all of the non-halogenated olefin oxides employed to prepare conventional polyols is replaced by a halogencontaining species such as 4,4,4-trichloro-1,2-epoxybutane. The concentration of halogenated olefin oxide is sufficient to attain a concentration of chlorine or bromine in the final polyol of between about 25 and 50%. If 4,4,4-trichloro-1,2-epoxybutane is used as the halogenated olefin oxide, this level of halogen is approximately equivalent to a final polyether polyol containing more than 15%, between 40 and 85% by weight of repeating units derived from the halogenated olefin oxide.

A second critical parameter for obtaining rigid polyurethane foams of adequate flame retardancy is the proportion of polyhydroxy compound, such as the aforementioned saccharides, that are reacted with the halogenated olefin oxide to obtain the final polyol. The polyhydroxy compound should constitute between about 8 and about 35% of the polyol.

The halogenated polyol is prepared by reacting a halogen-containing olefin oxide such as 4,4,4-trichloro-1,2-epoxybutane with the aforementioned saccharide or suitable derivative thereof, as described hereinbefore, at a temperature of between 30° and about 300°C., preferably between 70° and 130°C. The reaction is carried out in the presence of a suitable acid catalyst which includes inorganic acids, such as hydrofluoric acid, organic carboxylic acids such as acetic and succinic acids or a Lewis acid. Representative Lewis acids include but are not limited to boron trifluoride etherate, aluminum trichloride, titanium tetrachloride, tin tetrachloride ferric chloride and acid clays such as Tonsil clay.

While 4,4,4-trichloro-1,2-epoxybutane is a preferred halogen-containing olefin oxide for preparing the present halogenated saccharide based polyols, any of the available brominated or chlorinated olefin oxides containing at least one chlorine or bromine atom per molecule can be employed for this purpose. Representative alternatives to the aforementioned chlorinated epoxybutane include but are not limited to trichloropropylene oxide and other similar olefin oxides disclosed in U.S. Pat. No. 3,402,169, epoxides such as trichloroamylene oxide, and the epoxides derived from cycloaliphatic halides, including mono-, di-, tri-, tetra- and perchlorinated cyclopentyl oxides and cyclohexyl oxides. The corresponding brominated analogues of all the foregoing epoxides are also suitable.

B. The Polyfunctional Isocyanate

Any of the known available polyfunctional isocyanates conventionally employed to prepare rigid polyurethane foams can be reacted with the aforementioned halogen-containing polyether polyols to obtain flame retardant foams. Suitable isocyanates contain an average of between about 2.2 and 2.7 isocyanate groups per molecule. Polymeric isocyanates such as polyphenylene polymethylene isocyanate are preferred for use in the present foams. Other suitable polyfunctional isocyanates include but are not limited to polytolyene diisocyanate, also referred to as "crude" tolylene diisocyanate.

The amount of isocyanate required to prepare a rigid foam is preferably equivalent to between 0.9 and about 1.2 —N=C=O radicals for each hydroxyl radical present on the halogenated polyol. Additional isocyanate can be employed, however this is usually desirable due to the high cost of these materials.

C. The Polymerization Catalyst

The halogen-containing polyols described in the foregoing specification are reacted with one or more polyfunctional isocyanates in the presence of a polymerization catalyst (sometimes referred to as a gel catalyst) that is a mixture of a dimethyltin-S,S'-bis(mercaptoacid ester) and a tertiary amine. The dimethyltin compound exhibits the general formula $(CH_3)_2Sn(SR^1COOR^2)_2$ wherein $R^1$ represents an alkylene radical containing between 1 and 12 carbon atoms and $R^2$ is an alkyl radical containing between 1 and 20 carbon atoms, a cycloalkyl, aryl, alkaryl or aralkyl radical. The alkyl portion of the alkaryl and aralkyl radicals contain between 1 and 12 carbon atoms. Dimethyltin-S,S'-bis(isooctyl mercaptoacetate) is a preferred catalyst, due primarily to the availability of the corresponding mercaptoester. The other esters are either available from commercial suppliers or can readily be prepared using known synthetic methods. For example, a monochlorocarboxylic acid is reacted with hydrogen sulfide or an alkali metal sulfide and the resultant mercaptoacid is esterified with the desired alcohol or phenol.

To optimize the properties of the foam, the present dimethyltin compounds are used in combination with a tertiary amine. The tin compound is present at a concentration of between 0.05 and 0.5 part by weight per 100 parts of the halogen-containing polyol and the concentration of the tertiary amine is between 0.2 and 1.5 parts per 100 parts of polyol. Typical tertiary amines can be either linear or heterocyclic and include but are not limited to N-methyl morpholine, N-hydroxyethyl morpholine, triethylene diamine, triethylamine, tricyclohexylamine and trimethylamine.

D. Other Additives

The characteristic cellular structure of polyurethane foams results from the volatilization of a foaming agent. The resultant bubbles are entrapped within the isocyanatepolyol reaction mixture, which generates the heat necessary to volatilize the foaming agent. The foaming agents customarily employed to prepare rigid polyurethane foams are halogenated hydrocarbons having a boiling point of between −30° and 80°C. This class of compounds includes but is not limited to monofluorotrichloromethane, difluorodichloromethane, 1,1,2-trichloro-1,2,2-trifluoroethane, methylene chloride, chloroform and carbon tetrachloride. The concentration of foaming agent can be varied over a relatively wide range. Between 10 and 50 parts by weight per 100 parts of polyol is generally considered adequate for a primary blowing agent in rigid foams. Mixtures of the foregoing blowing agents can be effectively employed, for example, 40 parts of trichlorofluoromethane and 10 parts of methylene chloride.

In order to obtain the desired uniform structure of small cells in the final foam it is desirable to include a silicone oil type of surfactant in the reaction mixture at a concentration of between about 0.5 to 3 parts by weight per 100 parts of polyol. Siloxaneoxyalkylene copolymers are also suitable surfactants.

Depending upon the properties desired in the final foam, it may be desirable to have certain additives present including fillers such as clay and calcium sulfate, dyes, fibers of glass or other material to impart structural strength plasticizers, deodorants and antioxidants such as hindered phenols.

The following examples disclose preferred formulations for preparing flame retardant, rigid polyurethane foams using the present polymerization catalysts, and should not be interpreted as limiting the invention as defined in the accompanying claims. All parts and percentages are by weight unless otherwise stated.

All of the foam samples were prepared using a polyol derived from the polymerization of 4,4,4-trichloro-1,2-epoxybutane in the presence of a saccharide-based material as described in U.S. Pat. No. 3,726,825. The polyol was obtained from the Olin Corporation. The hydroxyl number of the polyol is 370. To 100.0 parts of this polyol were added 2.0 parts of a silicone surfactant, 15 parts trichlorofluoromethane, 1.0 part N,N-dimethylcyclohexyl amine and 0.2 part dimethyltin-S,S'-bis-(isooctyl mercaptoacetate). The foregoing ingredients were blended for 1 minute using a high speed mixer, following which 93.0 parts of a polymethylene polyphenylene isocyanate were added. The resultant mixture was stirred for five seconds then poured into a rectangular container. Creaming of the mixture was observed 15 seconds after the isocyanate addition. The foam had completely risen in 52 seconds and was tack free after 60 seconds. The foam was highly resiliant. The flame retardancy of the foam was sufficiently high that it did not ignite when held in a flame for up to one minute.

Eleven foam samples were prepared using the procedure and reactants set forth in the preceding paragraph, with the exception that the dimethyltin compound was replaced by an equal weight of one of the following organotin compounds: dibutyltin-S,S'-bis-(isooctyl mercaptoacetate), butyltin-S,S,'S''-tris-(isooctyl mercaptoacetate), methyltin-S,S,'S''-tris-(isooctyl mercaptoacetate), octyltin-S,S,'S''-tris(isooctyl mercaptoacetate), dibutyltin bis(lauryl mercaptide), dibutyltin dilaurate, dibutyltin bis(dibutyldithiocarbamate), dimethyltin bis(dibutyldithiocarbamate), dimethyltin bis(butyl mercaptide), butyltin tristallate and butyltin tris(dibutyldithiocarbamate). The cream time for the foams was between 8 and 15 seconds and the rise time between 30 and 60 seconds.

The foregoing twelve rigid polyurethane foams were tested side by side for friability. The test procedure was as follows:

1. The center top surface was punctured using finger pressure. Poor foams had no surface integrity and the finger penetrated deeply into the foam with a minimum amount of pressure. Good foams had a hard surface, with a tough skin, which could be penetrated only by exerting a considerable force.

2. Once the foam had been punctured, an index finger was rubbed across the surface of the puncture.

The foam sample prepared using dimethyltin-S,S-bis-(isooctyl mercaptoacetate) required a greater amount of force to penetrate than any of the other samples, and retained its integrity in part two of the test. All of the other samples crumbled to a powder in the area adjacent to the puncture.

What is claimed is:

1. A method for preparing a flame retardant, rigid polyurethane foam of reduced friability from halogen-containing polyols by reacting
    a. 100 parts of a saccharide based polyol containing 4 hydroxyl groups, between 25 and 50% by weight of chlorine or bromine and exhibiting a hydroxyl number of between 175 and 800, the polyol being derived from the reaction of a bromine- or chlorine-containing olefin oxide containing between 3 and 12 carbon atoms with (1) a saccharide selected from the group consisting of dextrose, sucrose, α-methyl glucoside, (2) a reaction product of said saccharide with water or an alcohol containing between 2 and 4 hydroxyl radicals, or (3) said reaction product which has subsequently been oxyalkylated,
    b. a polyfunctional isocyanate exhibiting a functionality of between 2.2 and 2.8, wherein the total number of equivalents of isocyanate is between 0.95 and 1.2 times the number of equivalents of hydroxyl radicals present in said polyol, said reaction being conducted in the presence of between 20 and 40 parts of a foaming agent selected from the group consisting of halogenated aliphatic hydrocarbons exhibiting a boiling point of between $-30°$ and $80°C$., between 0.05 and 0.5 part of a polymerization catalyst of the formula $(CH_3)_2Sn(SR^1COOR^2)_2$ wherein $R^1$ is an alkylene radical containing between 1 and 12 carbon atoms and $R^2$ is selected from the group consisting of alkyl radicals containing between 1 and 20 carbon atoms, cycloalkyl, aryl, alkaryl and aralkyl radicals, between 0.2 and 1.5 parts of a tertiary amine cocatalyst and between 0.5 and 3 parts of a silicone oil surfactant.

2. A method for preparing a rigid polyurethane foam as described in claim 1, wherein the polymerization catalyst is a dimethyltin-S,S'-bis(alkylmercaptoacetate).

3. A method for preparing a rigid polyurethane foam as described in claim 2 wherein the polymerization catalyst is dimethyltin-S,S'-bis(isooctyl mercaptoacetate).

4. A method for preparing a rigid polyurethane foam as described in claim 1 wherein the chlorine-containing olefin oxide is 4,4,4-trichloro-1,2-epoxybutane.

5. A method for preparing a rigid polyurethane foam as described in claim 1 wherein the polyfunctional isocyanate is a polyphenylene polymethylene isocyanate.

6. A method for preparing a rigid polyurethane foam as described in claim 1 wherein the foaming agent contains only carbon, chlorine and fluorine.

7. A method for preparing a rigid polyurethane foam as described in claim 6 wherein the foaming agent is trichlorofluoromethane.

* * * * *